March 15, 1966  J. G. READ  3,240,056
MOTOR TEST TANK
Filed June 14, 1963  4 Sheets-Sheet 1

INVENTOR
James Gordon Read

BY
Irons, Birch, Swindler & McKie
ATTORNEYS

INVENTOR
James Gordon Read
BY Irons, Birch,
Swindler & McKie
ATTORNEYS

March 15, 1966 J. G. READ 3,240,056
MOTOR TEST TANK

Filed June 14, 1963 4 Sheets-Sheet 4

INVENTOR
James Gordon Read

BY
Irons, Birch, Swindler & McKie
ATTORNEYS

United States Patent Office 3,240,056
Patented Mar. 15, 1966

3,240,056
MOTOR TEST TANK
James Gordon Read, Jacksonville Beach, Fla., assignor to Gator Trailers Corp., Jacksonville, Fla., a corporation of Ohio
Filed June 14, 1963, Ser. No. 288,557
10 Claims. (Cl. 73—116)

This invention relates to motor testing equipment and more particularly to test tanks for marine motors.

Accurate testing of marine motors and particularly outboard motors is difficult to achieve on land because of the problems presented in simulating the conditions encountered in actual use. Particular difficulty attends the testing of motors utilizing high speed propellers. Test operation in the air is subject to the obvious disadvantage that the propeller is subjected to little or no load. Not only are such conditions abnormal thereby failing to provide a true test, but operation at substantially no load can be accomplished for only a few seconds without damaging the motor.

Various equipment has been developed for testing marine motors with the propeller immersed in water in an attempt to load it. Perhaps the primary obstacle to be overcome in thus operating the propeller is that of cavitation. The propeller, particularly at high speed, tends to create an open cavity around it thereby dangerously diminishing the load. Cavitation is particularly prevalent in the case of outboard motors which commonly emit their exhaust in the vicinity of the propeller thereby tending to enlarge the cavity. Various attempts have been made to develop a test tank which circulates the water driven by the propeller thereby providing a constant supply of water to the propeller. Generally, however, devices of this character which heretofore have been available have not sufficiently reduced cavitation to simulate accurately the conditions which occur in actual operation on a boat.

To overcome the disadvantages of the prior art, a primary object of the present invention is to provide an improved motor test tank wherein cavitation is minimized and actual operating conditions are closely simulated.

A further object of the invention is to provide such a test tank which minimizes splashing of water out of the tank during use.

Another object of the invention is to provide such a test tank which is adaptable for use with a variety of different motors operating at various horsepowers and speeds.

Yet another object of the invention is to provide such a test tank which is easily accessible and adapted for use with outboard motors while they are fixed to a boat mounted on a trailer.

The invention is generally directed to a motor test tank which comprises a water retaining and circulating vessel providing a test tunnel having a water inlet and a water outlet, and conduit means to conduct water from said outlet to said inlet, said vessel having an opening to permit a motor propeller to be disposed at a location from which the propeller will drive water through said tunnel toward said outlet, and means to restrict said tunnel downstream from said location, said tunnel being substantially closed between said location and said restriction so that substantially all of the water driven by the propeller is forced through said restriction thereby expressing gas from the water and loading the propeller, said vessel having an exhaust outlet for the expressed gas.

The invention having been generally described a preferred specific embodiment will now be set forth in detail with reference to the accompanying drawings in which.

Figure 1:
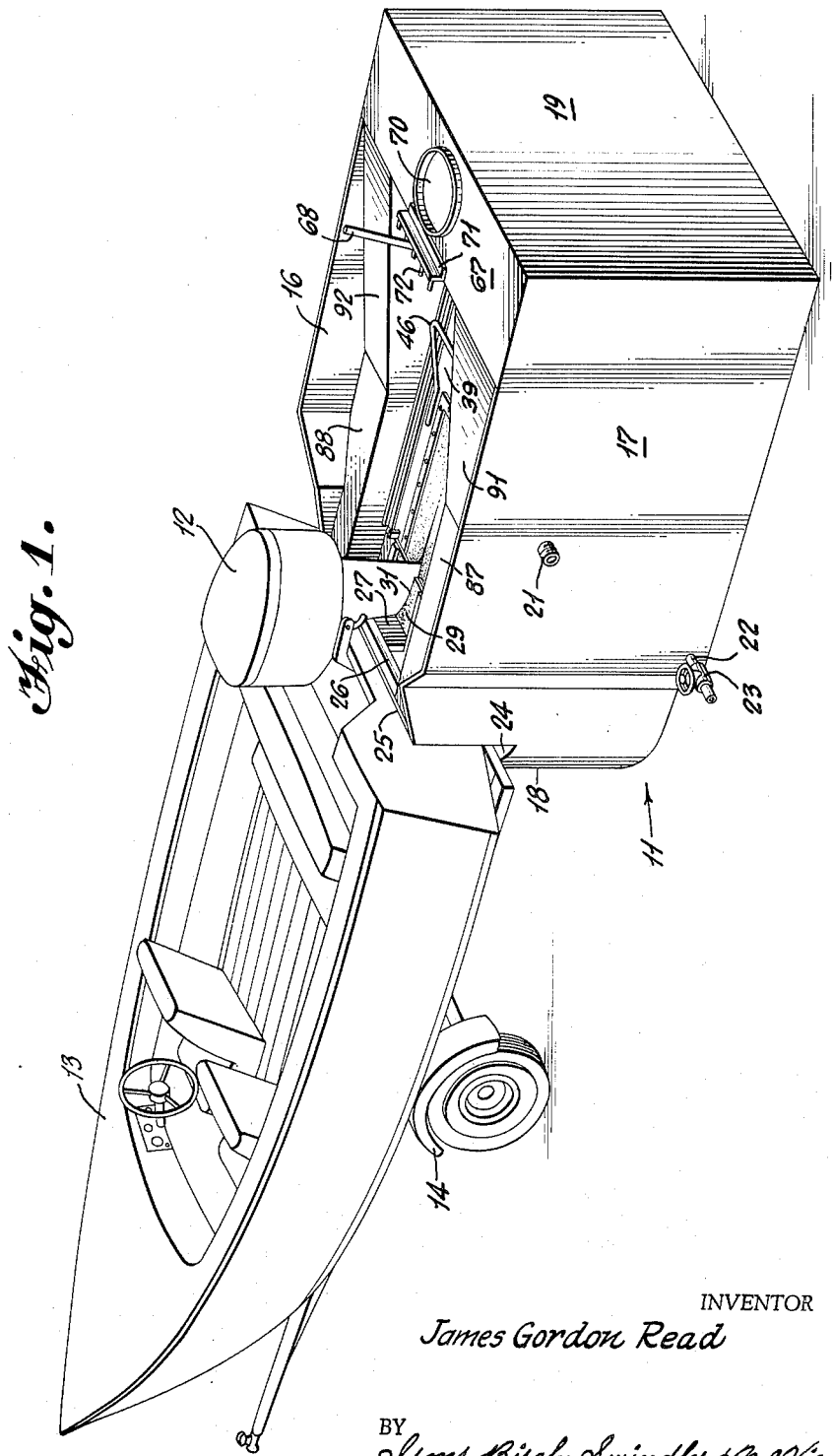
FIGURE 1 is an isometric view of a test tank according to the invention being used to test an outboard motor affixed to a boat which in turn is mounted on a trailer.
Figure 4:
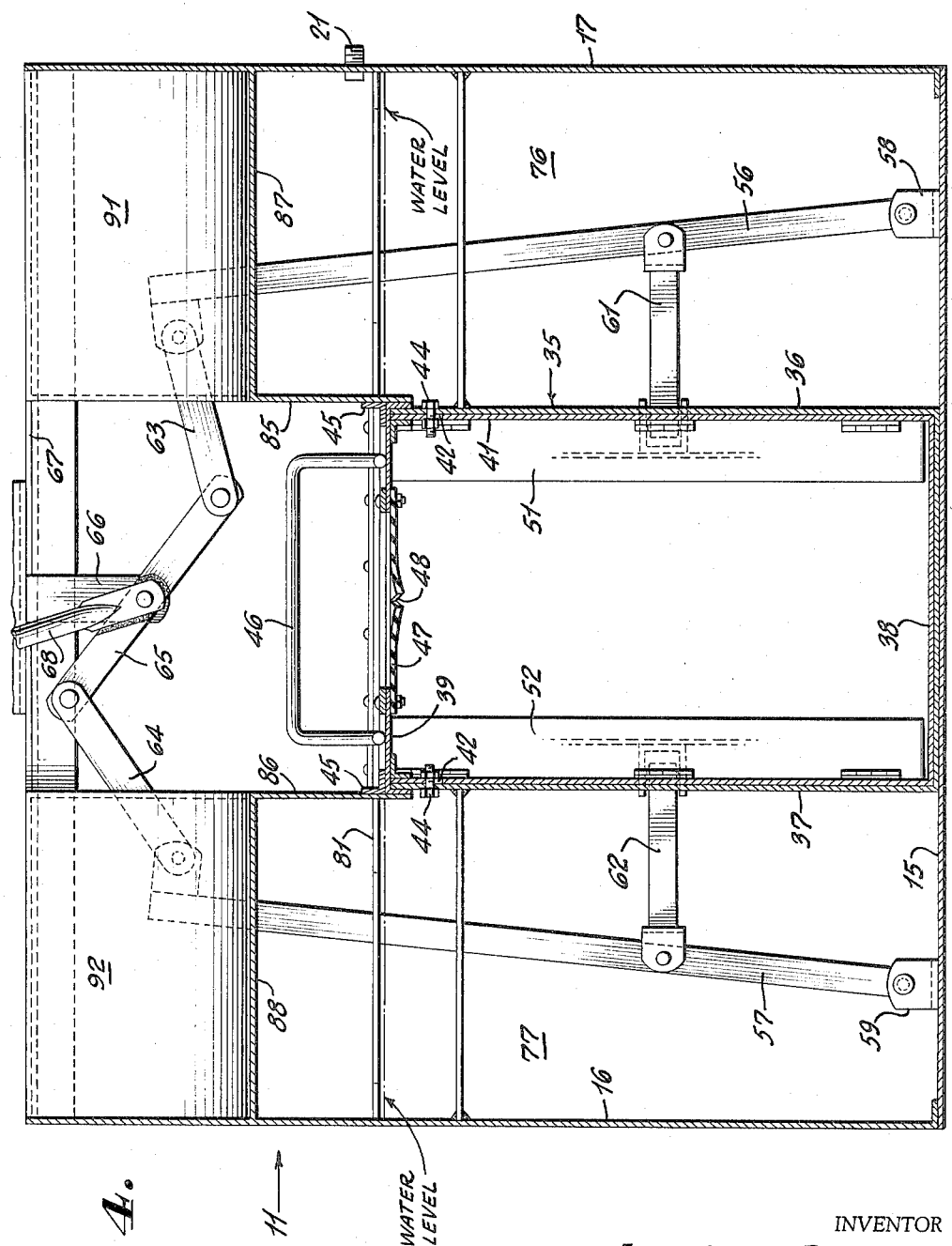
FIGURE 4 is a vertical section taken along the line 4—4 of FIGURE 3.

The test tank shown in the drawings is identified generally by the reference numeral 11. Such tank as shown in FIGURE 1 is used to test an outboard motor 12 affixed to a boat 13 which in turn is mounted on a boat trailer 14. The test tank 11 includes a bottom wall 15, side walls 16 and 17 and end walls 18 and 19 which together form a water retaining and circulating vessel. A water filling connection 21 is provided in one wall of the tank through which water may be introduced to a substantial level in the tank as illustrated in FIGURE 4. Also mounted at at low point on one wall of the tank is a water drain fitting 22 equipped with a valve 23.

The front end of the tank 11 is provided with a step 24 to permit the rear end of a trailer to ride over the top of the step to a position against a vertical transom 25. A reinforcing flange 26 and a motor thrust block 27 are situated on the interior side of the upper edge of the transom 25. Extending inwardly from the transom 25 at a point below the thrust block 27 is a horizontal retaining plate 28. The central portion of the plate 28 is slotted to receive a flexible packing 29 of rubber or similar material. A V-shaped notch 31 is formed in the rubber packing.

The motor 12 may be positioned for testing while mounted either on the boat 13 as shown in FIGURE 1 or affixed to the transom 25. Thus, the invention may be utilized as a drive-up test tank but is not limited to such use. In either event the motor is positioned with its propeller well below the water level of the tank and facing rearwardly into the tank. The vertical shaft housing of the motor fits into the notch 31 with the rubber packing 29 providing a seal.

Mounted in the tank 11 preferably in a central location is a test tunnel 35 which is comprised of side walls 36 and 37, a bottom wall 38 and a sliding cover 39 which provides a top wall. The inlet end of the tunnel 35 is provided with a telescoping extension 41 which is adjustable to accommodate motors of various sizes. The extension 41 is positioned in close proximity to the motor propeller 32 so that the latter when the motor is operating drives water directly into and through the tunnel 35. If desired the extension 41 may be positioned so that the propeller is actually inside of the tunnel. Adjustment of the telescoping extension 41 is accomplished by any suitable mechanism such as that illustrated in FIGURE 2 wherein a longitudinal notch 42 and a plurality of short lateral notches 43 are formed near the top of the side walls of the extension 41. Cooperating with the notches 41 and 43 is a bolt 44 which extends through the side walls 36 and 37.

The sliding cover 39 is movable longitudinally between the top of the side walls 36 and 37 of the tunnel and a pair of angles 45 which define a trackway. Adjustment of the cover 39 is accomplished manually by means of an external handle 46. The front end of the sliding cover 39 is provided with a slot to receive a packing 47 of rubber or similar material which packing is provided with a V-shaped notch 48 which opposes the notch 31 in the packing 29. When the outboard motor 12 is mounted in test position the cover 39 may be closed with the notch 48 extending over the vertical shaft housing of the motor with the packings 29 and 47 forming a seal.

Figure 3:
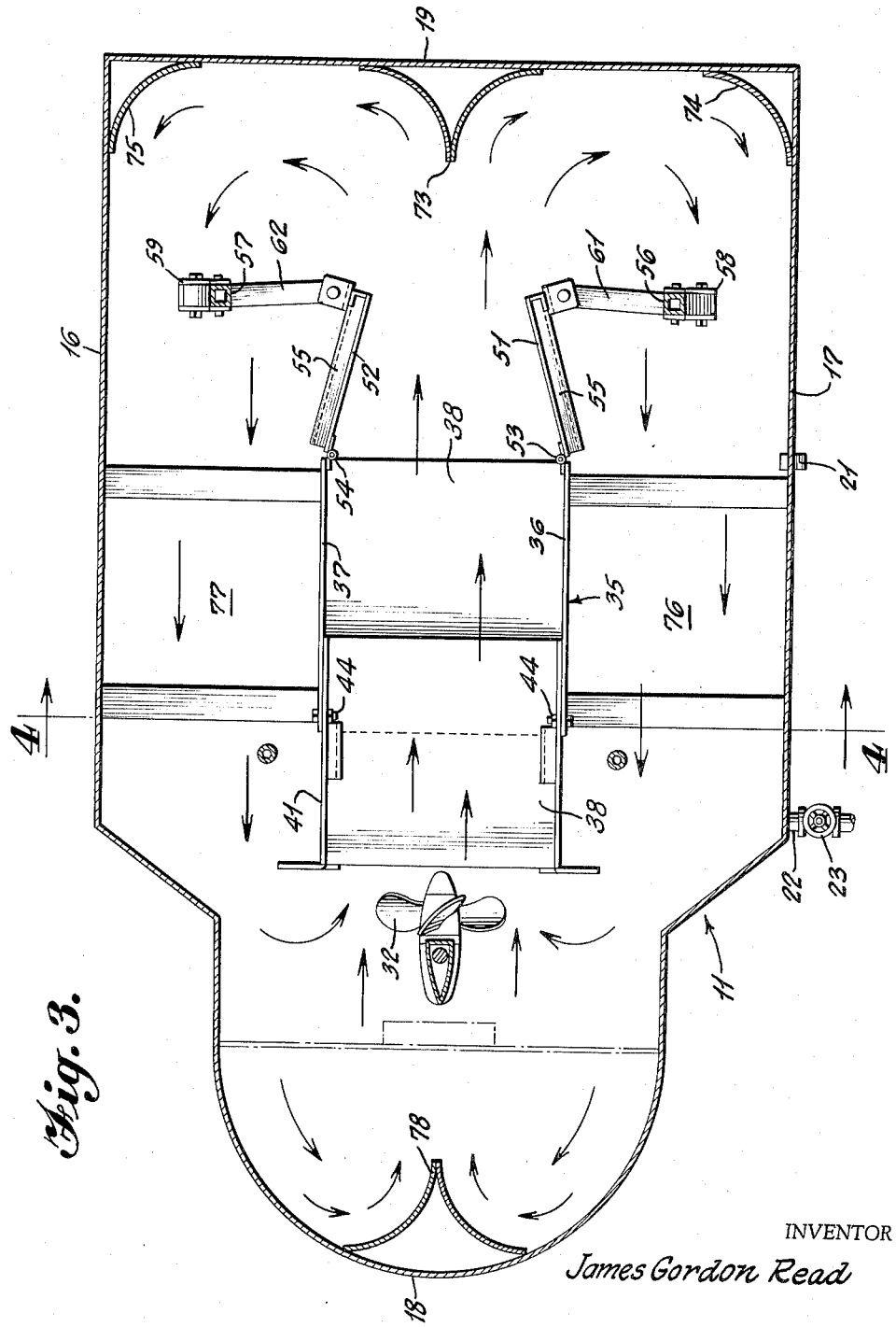
FIGURE 3 is a horizontal sectional view taken through the middle of the test tank.

The rear or outlet end of the tunnel 35 is provided with an adjustable restriction defined by a pair of pivoted gates 51 and 52 which are connected by vertical hinges 53 and 54 to the side walls 36 and 37. The gates 51 and 52 are formed of sheet material reinforced on their outer walls by horizontal angles 55. As best shown in FIGURE 3 the gates 51 and 52 provide a progressively diminishing outlet portion for the tunnel 35.

Any suitable mechanism may be employed to adjust the gates 51 and 52 and retain them in position once adjusted. One specific mechanism for accomplishing such adjusting is shown in the drawings. Such mechanism includes a pair of vertical posts 56 and 67 pivotally connected to mounting brackets 58 and 59. Horizontal links 61 and 62 connect the posts 56 and 57 respectively to the gates 51 and 52. Thus, pivotal movement outwardly and inwardly of the posts 56 and 57 moves the gates 51 and 52 outwardly and inwardly, respectively. Attached to the tops of the posts 56 and 57 by pivotal connections are the outer ends of a pair of links 63 and 64, the inner ends of which are in turn connected to an operator bar 65 pivoted at its center to a vertical bracket 66 which in turn is rigidly connected to the rear top plate 67 of the tank 11. Plate 67 is provided with a central exhaust opening 70. Rigidly fixed to the operator bar 65 is a lever handle 68 which may be moved from side to side thereby pivoting the operator bar 65 and through the described linkages moving the gates 51 and 52. The handle 68 is held in various adjusted positions by a locking bar 71 in which a plurality of protruding pins 72 are mounted. The flexibility of the top plate 67, the bracket 66 and the handle 68 enable the latter to be moved in and out of the spaces between the pins 72.

When the propeller is rotated and water is driven through the tunnel 35 between the gates 51 and 52 the water moves into the space between the gates and the rear end 19 of the tank. It is there divided by a splitter baffle 73 into two streams which move laterally outwardly and are again deflected by a pair of arcuate corner baffles 74 and 75. The water then moves in the opposite direction to that flowing through the tunnel 35 through conduits 76 and 77 which are formed in the spaces between the tunnel side walls and the side walls 16 and 17 of the tank 11. The water then flows past the front of the tunnel to the front of the tank where it is deflected by the front baffle 78 back toward the original direction into the propeller 32 which once again drives it through the tunnel 35.

Situated in the rear of the tank 11 at a point slightly above the top of the tunnel 35 is a horizontal baffle plate 81 which is slotted at 82 and 83 to accommodate the vertical posts 56 and 57. A rubber seal 84 is provided between the front edge of the baffle 81 and the sliding cover 39 of the tunnel 35.

Figure 2:
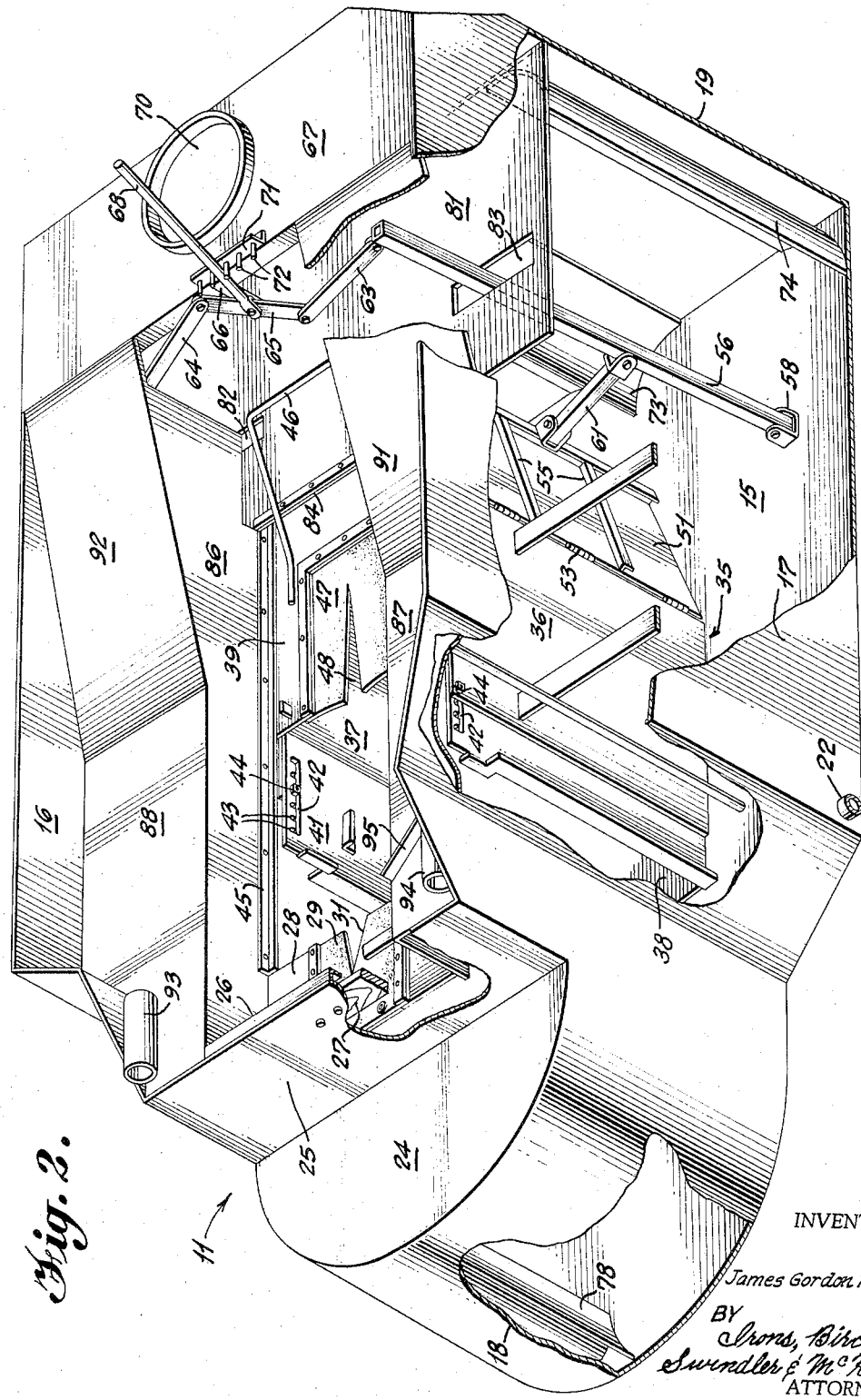
FIGURE 2 is an isometric view of the same test tank with portions broken away to illustrate the test tunnel inside of the tank.

The tops of the conduits 76 and 77 on opposite sides of the tunnel 35 are closed by vertical side plates 85 and 86 respectively, by horizontal forward top plates 87 and 88 respectively, and by inclined rear top plates 91 and 92 respectively. A pair of guide pipes 93 and 94 are mounted at the front of the forward top plates 88 and 87 respectively. Further, as shown in FIGURE 2, a drain plate 95 is affixed in angular position to the top of the plate 87.

In operation an outboard motor 12 is mounted in test position. The motor may either be affixed to the back of a boat mounted on a trailer with the trailer backed up against the transom 25 or the motor may be connected directly to the transom 25. In either event the propeller is positioned facing the inlet to the tunnel 35. The telescoping extension 41 at the end of the tunnel is moved so that the propeller is close to the tunnel inlet or actually extending into such inlet. The sliding cover plate 39 of the tunnel is then moved against the front of the tank so that the notch 48 in the packing 47 forms a seal around the vertical shaft housing of the motor.

Either before or after the mounting of the motor, water is introduced into the tank to a level which preferably completely fills the tunnel 35 as shown in FIGURE 4. The motor is then started and the rotating propeller drives water rearwardly through the tunnel. The gates 51 and 52 are adjusted to restrict the tunnel outlet to subject the motor to the desired load—the greater the restriction the greater the load. It will be seen that since the tunnel 35 is substantially completely closed from the location of the propeller 32 to the restriction formed by the gates 51 and 52 substantially all of the water driven by the propeller is forced through the tunnel and past the restriction. The resulting pressurization of the water in the tunnel inhibits cavitation around the motor. Since the exhaust outlet of outboard motors is conventionally placed near the propeller, the exhaust gases materially contribute to the cavitation effect. Since the restriction pressurizes the water in the tunnel, however, it expresses the gases out of the water which find their way around the various surfaces to the exhaust port 70. The water flowing out of the tunnel is provided by the splitter baffle 73 into two separate channels flowing through conduits 76 and 77 outside of the tunnel. The water is again reversed in direction at the front of the tank by the baffle 78 and is directed once again to the propeller 32 to provide a constantly renewed supply of water for the propeller simulating the condition which normally occurs in use when the propeller moves through the water.

The closed tunnel not only minimizes cavitation and results in a squeezing of gas out of the water but also prevents or minimizes escape of water through splashing upwardly out of the tank.

There has been illustrated and described what is considered to be a preferred specific embodiment of the invention. It will be understood, however, that various modifications may be made by those skilled in the art without departing from the broader scope of the invention which is defined solely by the appended claims.

What is claimed is:
1. A motor test tank which comprises
   a water retaining and circulating vessel providing
      a test tunnel having a water inlet and a water outlet, and conduit means to conduct water from said outlet to said inlet,
   said vessel having an opening to permit a motor propeller to be disposed at a location from which the propeller will drive water through said tunnel toward said outlet, and
   means to restrict said tunnel downstream from said location,
   the walls of said tunnel being substantially closed against escape of water between said location and said restriction so that substantially all of the water driven by the propeller is forced through said restriction thereby expressing gas from the water and loading the propeller,
   said vessel having an exhaust outlet for the expressed gas.

2. A motor test tank according to claim 1 wherein said tunnel has an adjustable telescoped portion at its inlet end.

3. A motor test tank according to claim 1 wherein the top wall of said tunnel comprises an adjustable cover movable between positions where said tunnel is substantially closed and accessible from above respectively.

4. A motor test tank according to claim 1 wherein said restricting means comprises adjustable gate means providing a progressively diminishing passage at the tunnel outlet.

5. A motor test tank according to claim 4 wherein said tunnel has an adjustable telescoped portion at its inlet end and an adjustable cover movable between positions where said tunnel is substantially closed and accessible from above respectively.

6. A motor test tank which comprises
a water retaining and circulating vessel having side walls, end walls and a bottom wall,
a test tunnel in said vessel having
an inlet and an outlet spaced from said vessel end walls,
top and bottom walls, and side walls spaced from said vessel side walls to provide conduits outside of said tunnel so that water in said vessel may be circulated through said tunnel in one direction and from said tunnel outlet through said conduits in the opposite direction back to said tunnel inlet,
said vessel having an opening to permit a motor propeller to be disposed at a location from which the propeller will drive water through said tunnel toward said outlet, and
means to restrict said tunnel downstream from said location,
said tunnel walls being substantially closed between said location and said restriction so that substantially all of the water driven by the propeller is forced through said restriction thereby expressing gas from the water and loading the propeller,
said vessel having an exhaust outlet for the expressed gas.

7. A motor test tank according to claim 6 wherein said tunnel has an adjustable telescoped portion at its inlet end.

8. A motor test tank according to claim 6 wherein the top wall of said tunnel comprises an adjustable cover movable between positions where said tunnel is substantially closed and accessible from above respectively.

9. A motor test tank according to claim 6 wherein said restricting means comprises adjustable gate means providing a progressively diminishing passage at the tunnel outlet.

10. A motor test tank according to claim 9 wherein said tunnel has an adjustable telescoped portion at its inlet end and an adjustable cover movable between positions where said tunnel is substantially closed and accessible from above respectively.

References Cited by the Examiner

UNITED STATES PATENTS

| | | | |
|---|---|---|---|
| 2,662,399 | 12/1953 | Chapman | 73—116 |
| 2,831,345 | 4/1958 | Wolf et al. | 73—116 |

RICHARD C. QUEISSER, *Primary Examiner.*